March 10, 1964 J. D. KUEHLER 3,124,790

APPARATUS FOR READING MAGNETIC OR ELECTROSTATIC BITS

Filed Jan. 30, 1959

4 Sheets-Sheet 1

INVENTOR.
JACK D. KUEHLER

BY Walter J. Madden Jr.

ATTORNEY

March 10, 1964 J. D. KUEHLER 3,124,790

APPARATUS FOR READING MAGNETIC OR ELECTROSTATIC BITS

Filed Jan. 30, 1959 4 Sheets-Sheet 2

March 10, 1964 J. D. KUEHLER 3,124,790

APPARATUS FOR READING MAGNETIC OR ELECTROSTATIC BITS

Filed Jan. 30, 1959

4 Sheets-Sheet 4

United States Patent Office 3,124,790
Patented Mar. 10, 1964

3,124,790
APPARATUS FOR READING MAGNETIC OR ELECTROSTATIC BITS

Jack D. Kuehler, San Jose, Calif., assignor to International Business Machines Corporation, New York, N.Y., a corporation of New York Filed Jan. 30, 1959, Ser. No. 790,249
1 Claim. (Cl. 340—174.1)

This application relates in general to signal transducer apparatus and relates more particularly to transducer apparatus for reading out magnetic or electrostatic data by means of an electron beam.

There is considerable need in many fields, such as the data processing field, for apparatus which is capable of rapidly reading out data stored in the form of either magnetic or electrostatic bits on a suitable recording or storage medium. Such bits form the basic code units in most forms of recorded information utilized in data processing, and the rapid and accurate read-out of these bits is essential for reliable high speed data processing equipment.

In accordance with the present invention, an electron beam is utilized in an electron mirror apparatus to produce the desired read-out of the data bits. In electron mirror apparatus, an electron beam is accelerated toward a target surface by means of an anode having a suitable positive potential with respect to the cathode. However, the target surface itself has a negative potential with respect to the cathode, so that there is a potential gradient decreasing to zero from the accelerating anode to the negative target surface. Under these conditions, the electron beam after passing the accelerating anode undergoes a deceleration as it approaches the negative target surface, and finally the axial velocity of the electron beam becomes zero at the line or point of zero potential, which point is usually a short distance from the target surface itself. Upon reaching zero axial velocity, the electron beam will be reversed in direction and returned toward the cathode, owing to the positive field in the returning direction, as an electron beam having an energy equal to the potential of the accelerating electrode.

The above described action of the electron beam may be modified by the presence of a magnetic or an electrostatic field on the target surface. In the case of a magnetic field on the target surface, the presence of this magnetic fringe field produces a deflection of the adjacent electron beam due to the Lorentz forces imposed by the horizontal and vertical components of the magnetic field. Similarly, in case of an electrostatic field on the target surface, the electron beam is deflected by the presence of this field. Thus, in the case of both magnetic and electrostatic fields on the target surface, the electron beam adjacent the surface is deflected so that the electron beam returns to a point which is different than the point to which the beam would have returned had there been no magnetic or electrostatic field present.

In the present invention, the electron mirror is utilized to detect the distribution of recorded bits on a surface by scanning the electron beam across the surface on which the data bits are recorded, and detecting the deflection of the returning beam as a function of the beam position on the target surface, to thus detect the presence and position of recorded bits on the target surface. In one embodiment of the present invention, the electron beam is accelerated toward a surface which is negative with respect to the cathode producing the electron beam and which contains the recorded bits to be read out. The beam is scanned across the target surface and the returning beam is collected by a pair of collector plates disposed symmetrically on either side of the beam path. In the absence of a recorded bit on the portion of the target surface immediately adjacent the point of beam impingement, there will be no deflection of the electron beam by a recorded bit so that the beam will be returned to a point determined by the scanning elements of the tube. This point of return of the beam in the absence of a bit deflection is chosen so that substantially equal portions of the returning beam fall on each of the collector plates, thus producing substantially zero difference between the electron current on the two plates. However, if a recorded bit is present on the target surface immediately adjacent the point of beam impingement, the electron beam will undergo a deflection as discussed above, and this deflection will cause the beam to be deflected with respect to the collector plates. There will thus be a difference in the number of electrons falling on the two collector plates, to thus produce an output pulse indicative of the detection of a bit on the target surface. By synchronizing the collector plate current detection apparatus with the beam scanning apparatus, there will be provided an indication of the position of the detected bit on the surface, so that a sequential read-out of the bits on the surface may be produced.

In an alternative embodiment of the invention, the beam deflection detection apparatus may be in the form of a light-emissive surface which is disposed with respect to the returning electron beam so that in the absence of a recorded bit on the recording surface, with its resultant deflection of the electron beam, only a small portion, if any, of the returning electron beam strikes the photoemissive surface and, hence, a small reference light pulse is produced. However, when the electron beam is deflected by the presence of a recorded bit on the recording surface, this beam deflection results in a substantial portion of the returning beam striking the light-emissive surface to produce a substantial light pulse. This substantial light pulse may be detected by suitable apparatus to produce an output signal which, when synchronized with the beam scanning apparatus, may be utilized to produce a read-out of the recorded information.

It is therefore an object of the present invention to provide improved apparatus for reading recorded data by means of an electron mirror.

It is an additional object of the present invention to provide apparatus for reading recorded data utilizing an electron mirror in which an electron beam is scanned across a surface on which the data is recorded and the deflection of the electron beam by the recorded data is determined to determine the presence and distribution of the recorded data on the surface.

It is a further object of the present invention to provide apparatus for reading recorded data by means of an electron mirror in which an electron beam is scanned across the surface having data recorded thereon, and the deflection of the electron beam by the recorded data is detected by means of a pair of symmetrical elements which produce an imbalance in current upon receipt of a deflected electron beam to produce an output pulse indicating the presence of recorded data.

It is an additional object of the present invention to provide apparatus for reading recorded data by means of an electron mirror in which a beam of electrons is scanned across a surface bearing the recorded data, and the deflection of the electron beam by the field associated with the recorded data is utilized to produce a light pulse whose occurrence in time indicates the presence of the recorded data and the position of this data on the target surface.

Objects and advantages other than those set forth above will be apparent from the following description, when read in connection with the accompanying drawings, in which.

Figure 4:
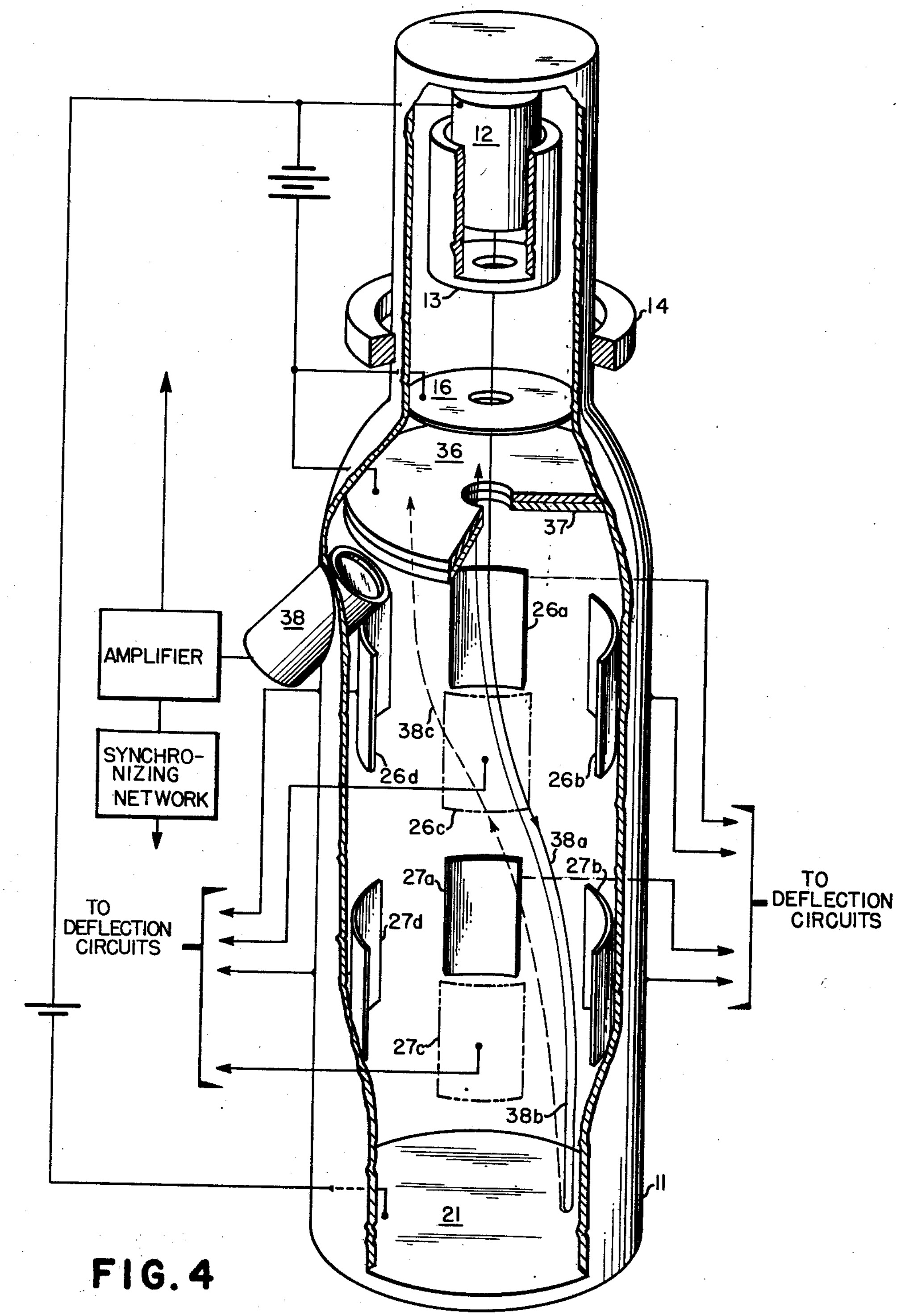
Figure 5:
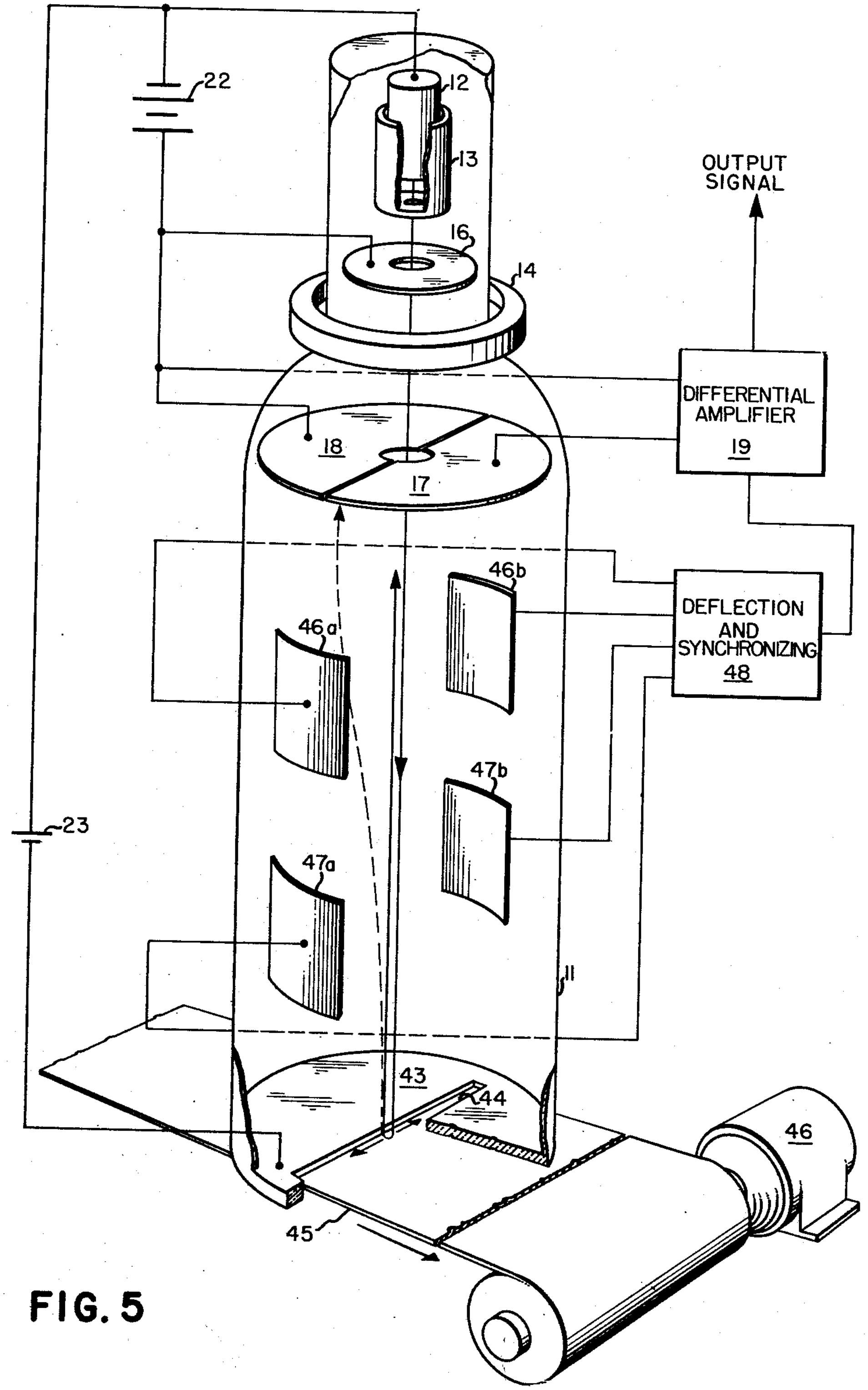

FIG. 4 is a perspective view, partly in section, illustrating the utilization of the present invention for determining the distribution of recorded bits on a surface by producing a light output pulse upon detection of a recorded bit; and FIG. 5 is a perspective view, partly in section, illustrating the present invention utilized to read out magnetic bits from a record surface which is disposed externally to the electron mirror envelope.

Figure 1:
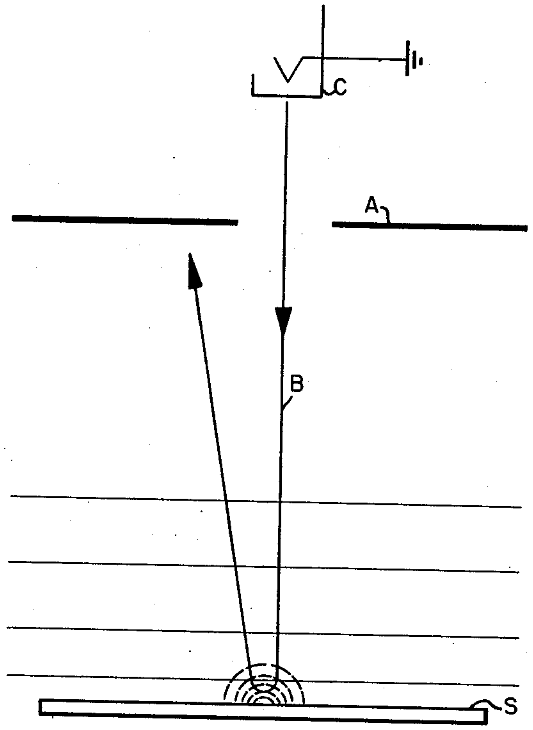
FIG. 1 is a diagram illustrating the theory of operation of the electron mirror in association with a magnetic field.

Referring to FIG. 1 there is shown a diagram illustrating the theory of an electron mirror in association with a magnetic field on a recording surface. In FIG. 1 the electron beam B produced by the cathode C is accelerated by an accelerating anode A toward a target surface S. As indicated in the drawing, the potential of anode A is sufficiently positive with respect to cathode C to accelerate the electron beam to the desired energy level. The potential of the surface S is preferably slightly negative with respect to the potential of cathode C, so that there exists between anode A and surface S a potential gradient approaching zero at the surface. This potential gradient is indicated by the numeric values assigned to different planes along the electron beam path, assuming that the potential of accelerating anode A is 10 kilovolts. After the electron beam passes accelerating anode A, it thus enters a region of decreasing potential, so that the beam is decelerated as it approaches surface S. Finally, when the electron beam reaches the zero or equi-potential line closely adjacent surface S, the electron's axial velocity is zero. The electron beam then reverses in direction and returns toward anode A as a 10 kilovolt electron under the action of the positive field which exists in the returning direction for the electron.

If no magnetic field is present on surface S in the vicinity of the point of beam impingement, the electron beam, upon reversing direction, will return to substantially its initial starting point. However, where a magnetic fringe field is present in the vicinity of the point of impingement of the electron beam, this fringe field produces a deflection of the electron beam. Since the electrons have a relatively low velocity in the vicinity of surface S, the electron beam is relatively easily influenced by the presence of magnetic fringe fields on surface S. These fringe fields produce a deflection of the slow electrons of the electron beam in accordance with the Lorentz forces imposed by the horizontal and vertical components of the magnetic field. Thus, as indicated by the path in FIG. 1 for the returning electron beam, the deflected electron beam returns to a point different from that to which it would return in the absence of a magnetic fringe field on surface S.

Figure 2:
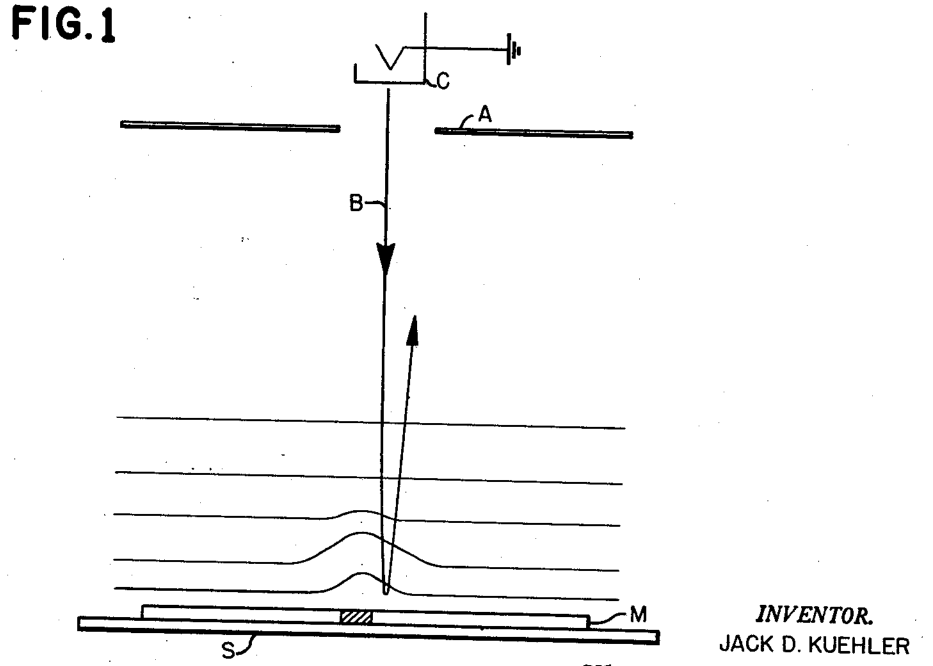
FIG. 2 is a diagram illustrating the theory of the electron mirror in association with an electrostatic field.

FIG. 2 illustrates a similar diagram illustrating the principle of operation of an electron mirror in association with an electrostatic field existing on a member M disposed adjacent the surface S which is negative with respect to the cathode C. FIG. 2 illustrates a potential gradient similar to that illustrated in the diagram of FIG. 1, assuming a 10 kilovolt potential on accelerating anode A. As shown in FIG. 2, the electron beam decelerates as it approaches the equi-potential plane closely adjacent surface S, and the slow electron beam is deflected by the electrostatic field present in member M at the point of beam impingement. This deflection of the electron beam by the electrostatic field causes the beam to return to a point different than that to which it would return in the absence of the electrostatic field.

Figure 3:
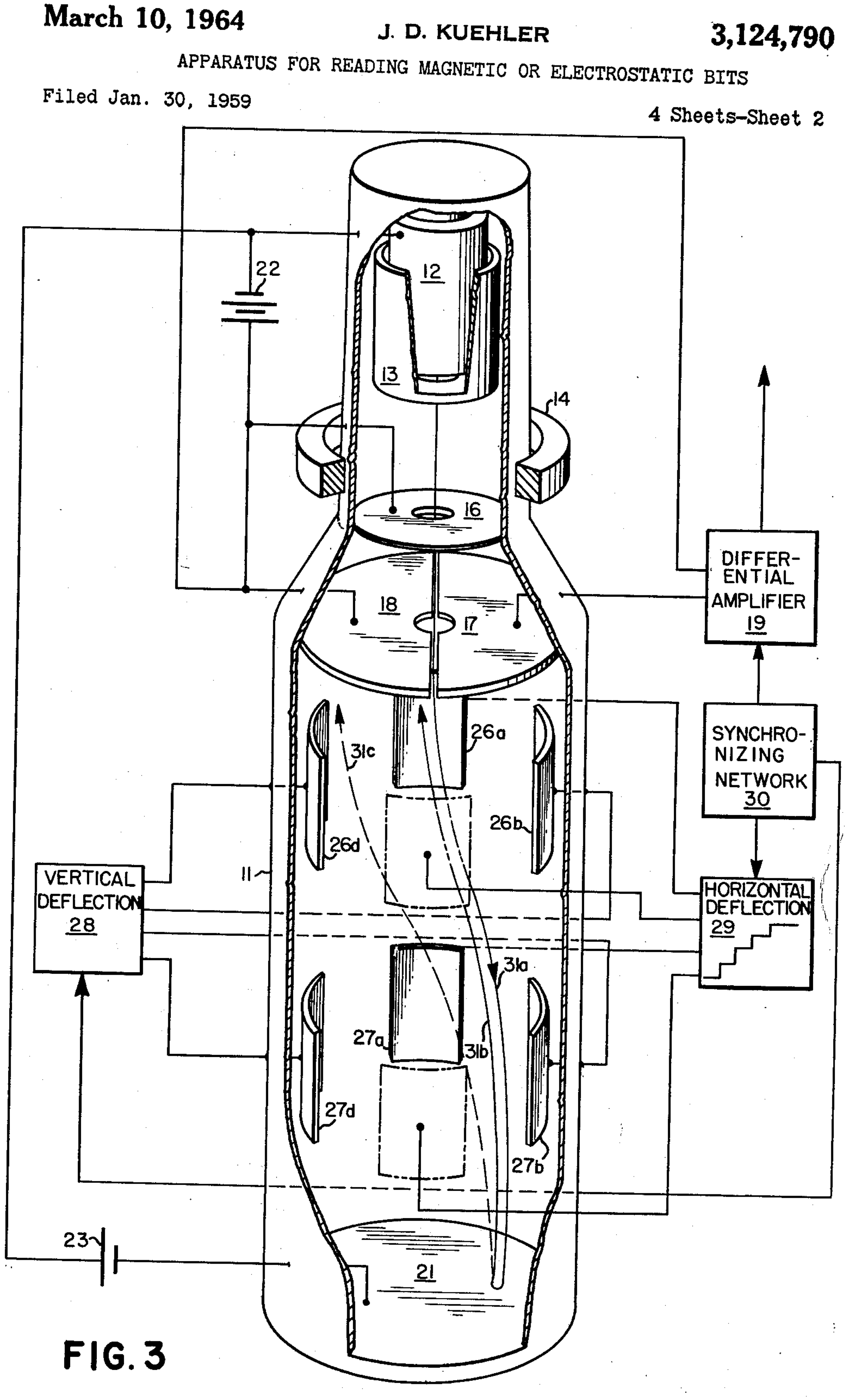
FIG. 3 is a perspective view, partly in section, schematically illustrating one form of apparatus for carrying out the present invention to determine the distribution of recorded bits on a surface by means of an electron mirror.

FIG. 3 illustrates apparatus in accordance with the present invention for detecting the presence and distribution of recorded data bits on a suitable surface. Reference character 11 designates the envelope of a cathode ray tube within which the electron beam generating and control apparatus is housed, together with the surface on which the recorded data is stored. The tube is provided with a cathode 12 for generating the beam of electrons, a control electrode 13, a focusing coil 14, and an accelerating anode 16 for accelerating the stream of electrons from cathode 12 toward the end of the cathode ray envelope. After passing the accelerating anode 16, the stream of electrons passes through an opening between a pair of collector plates 17 and 18 which are at the same potential as anode 16 and which are connected to a differential amplifier 19.

The electron beam then approaches the recording surface 21 which is disposed at the opposite end of tube 11. Surface 21 may be of any suitable type on which data may be recorded, either magnetic or electrostatic. For example, surface 21 may be a magnetizable material on which magnetic bits are produced by first magnetizing the entire surface 21 to saturation and then demagnetizing selected areas or points of the surface with an electron beam by means of Curie point writing, as taught in copending application Serial No. 785,959, and now abandoned, assigned to the same assignee as the present application. Accelerating anode 16 is provided with a suitable accelerating potential, represented by battery 22, to accelerate the beam of electrons from cathode 12 toward surface 21. Surface 21 is preferably maintained at a potential which is slightly negative with respect to cathode 12, as represented by battery 23, to produce the desired point of reversal of the electrons as they approach surface 21.

To detect the distribution of recorded data on surface 21, the electron beam is scanned across and down the surface 21 in any suitable manner, and the deflection of the electron beam by the fields surrounding the recorded data is detected as a function of the scanning to determine the distribution of the recorded data on surface 21. Such scanning of the electron beam across surface 21 may be performed by means including a first set of deflection plates **26*a*, 26*b*, 26*c*, 26*d* and a second set of deflection plates 27*a*, 27*b*, 27*c*, 27*d*. Deflection plates 26 serve to move the electron beam off the central axis of the tube to the desired position, and the deflection plates 27 serve to return the beam to a path which is normal to the surface 21 at the desired location on the surface. Deflection plates 26 and 27 are connected to suitable vertical and horizontal generator networks 28 and 29 for producing the desired sweep voltages on these plates. Networks 28 and 29 may be connected to a synchronizing network 30 which is also connected to differential amplifier 19 to synchronize the beam scan with the output from amplifier 19**.

The sweep of surface 21 by the beam may be performed in any desired manner, such as, for example, by scanning the surface from left to right and from top to bottom by row, in a manner similar to that of a television raster scan. This type of scan would, of course, produce a serial read-out of the data stored on surface 21. Regardless of the method of scanning employed, it will be generally desirable in reading out the data bits to have the beam at rest at each bit position for some small fraction of time before it is moved to the next bit position to be scanned. Accordingly, it is desirable to provide the one pair of each of the sets of deflection plates 26 and 27 with a "staircase" wave form deflection voltage, with the horizontal or flat portion of the voltage wave form corresponding to the dwell time of the electron beam on a given bit position, and the vertical or rise time of the staircase wave form corresponding to the voltage for moving the electron beam to the next bit position to be scanned.

If it is desired to have random access to the data stored on surface 21, i.e., if it is desired to read out any bit or group of bits on surface 21 without regard to the order in which such bits are disposed on the surface, the scanning voltages applied to deflection plates 26 and 27 may be modified to produce such random access. One method of obtaining this random access to the data recorded on surface 21 is to utilize a counter which counts in relation to the scanning voltages applied to plates 26, 27 and which is supplied with a number representing the address of the desired bit position on surface 21. This counter is connected to a beam blanking circuit for suppressing the electron beam from the cathode 12 until the counter reaches the count representing the desired address. When this count is reached, the deflection voltages applied to plates 26 and 27 are such that they will position the beam at the desired bit position on surface 21, so that when the beam is unblanked it will be at the desired location on surface 21.

To summarize the operation of the apparatus described thus far, the beam of electrons produced at cathode 12 is accelerated by anode 16 through the opening between collector plates 17 and 18 to and into the portion of the tube having a decreasing potential gradient. In this portion of the tube, the beam is deflected first by plates 26 to move the beam off the central axis of the tube and then deflected by plates 27 to return the beam to a path normal to the surface 21. The beam is thus scanned across surface 21 in a manner determined by the deflection voltages generated by networks 28 and 29. It will be understood that the electron beam does not actually touch surface 21, since the surface is slightly negative with respect to cathode 12, so that the electron beam decelerates as it approaches the surface and reverses in direction just prior to reaching surface 21.

The path of the electron beam toward surface 21 for a given scanning position is illustrated by path 31*a*, illustrating the deflection off the central axis by plates 26 and the deflection to a path normal to surface 21 by plates 27. In the absence of a recorded bit on the portion of surface 21 immediately adjacent the point of the impingement of the electron beam, there is no deflection of the electron beam by the recorded data, so that the beam, after reversing direction, returns along the path 31*b* toward collector plates 17 and 18. Under these conditions the beam returns to substantially the center of collector plates 17 and 18, thus producing a substantially equal current flow in both of these plates so that the current output from differential amplifier 19 is substantially zero.

When the beam approaches a portion of surface 21 on which a bit is recorded, the low velocity electron beam is deflected by the field existing adjacent the bit, as discussed above, so that the returning beam is deflected from the path it would have taken had there been no bit present. This deflection of the beam by a bit present on surface 21 is illustrated by the path 31*c*. As indicated, this deflection by the field existing around the bit causes the returning electron beam to be deflected from its original path, so that the returning beam impinges on one or the other of collector plates 17 and 18 (collector plate 18 in the illustrated embodiment). This impingement on plate 18 produces an imbalance of current through differential amplifier 19, so that this amplifier produces an output pulse indicating the detection of a bit on surface 21. Since the output pulse from amplifier 19 is synchronized by a network 30 with the scanning of the electron beam across surface 21, the time of occurrence of this pulse from differential amplifier 19 in relation to the scanning position of the electron beam produces an indication of the location of the bit on surface 21.

FIG. 4 illustrates an alternative embodiment of the present invention in which the deflection of the scanning electron beam by recorded data bits on the recording surface produces light pulses from a light-emissive surface and these light pulses are converted into a suitable signal indicating the detection of data bits on the recording surface. In FIG. 4, reference numeral 11 again designates the envelope of the cathode ray tube in which the beam generating and scanning elements and the recording surface 21 are disposed. The stream of electrons is generated at cathode 12 and controlled in intensity by grid 13, and the resulting electron beam passes through accelerating anode 16 toward the end of envelope 11 containing recording surface 21. The electron beam, after passing accelerating anode 16, passes through the opening in a substantially circular plate member 36 which is coated on the side facing recording surface 21 with a suitable cathodoluminescent material, such as phosphor. It will be understood that material 37, when struck by electrons, emits light which may be detected by suitable means, such as a photo-multiplier tube 38 which is suitably oriented with its aperture facing the light-emissive material 37. Thus, when electrons strike material 37, the resulting light pulse produced by this material causes photo-multiplier tube 38 to produce a corresponding output signal.

The remainder of the apparatus of FIG. 4 is similar to that illustrated in FIG. 3, and includes the two sets of deflection plates 26*a*, 26*b*, 26*c*, 26*d* and 27*a*, 27*b*, 27*c*, 27*d*. As in the embodiment of FIG. 3, the deflection plates 26 are utilized to move the electron beam off the central axis of envelope 11, and plates 27 serve to redirect the electron beam into a path which is normal to the recording surface 21. Deflection plates 26 and 27 are supplied with suitable deflection voltages from networks 28 and 29. Thus, the beam of electrons generated at cathode 12 is accelerated by anode 16 through the opening in plate 36 toward recording surface 21 along the path 38*a*, and the beam decelerates as it approaches this recording surface.

In the absence of a recorded bit on the portion of surface 21 immediately adjacent the point of impingement of the electron beam, the electron beam will not be deflected by any field existing around an adjacent recorded bit, so that the return path of the beam is determined by the deflection plates 26 and 27. This return path in the absence of a recorded bit on surface 21, as indicated by path 38*b*, is chosen so that the electron beam passes through the opening in plate 36, so that little or no light is produced from material 37. However, when a recorded bit is present on surface 21 adjacent the point of impingement of the electron beam, the resulting deflection of the electron beam by the field surrounding this bit causes the returning beam to strike material 37, as indicated by path 38*c*, to thus produce a substantial light pulse from this material. This light pulse is sensed by photo-multiplier tube 38 and converted into an electrical signal which is supplied to the read-out apparatus for utilization in a suitable manner. As in the embodiment of FIG. 3, the electrical pulses from photo-multiplier 38 are preferably synchronized with the scanning of the electron beam across recording surface 21, so that the time of occurrence of the signal from photo-multiplier tube 38 provides an indication of the distribution of the detected bits on recording surface 21.

FIG. 5 illustrates an additional alternative embodiment of the present invention adapted to read-out recorded data from a length of magnetic tape which is external to the cathode ray envelope 11. As shown in FIG. 5, the enlarged end of envelope 11 located opposite to the cathode is formed of a sheet of nonmagnetic material 43, which is sealed to the envelope wall. This sheet is provided with a magnetically permeable window 44 which may comprise a narrow slot extending not quite all the way through material 43. The length of window 44 in one direction is equal to or somewhat in excess of the excursion of the beam of electrons in the course of its scan in that direction, while the window width in the other direction is only as great as is required to read one width of bits. A length of magnetic tape 45 which carries the recorded data bits to be read out may be moved in a direction normal to the length of window 44 by a motor 46 or other suitable means.

In operation, the beam of electrons generated by cathode 12 is accelerated by accelerating anode 16 toward the end of envelope 11 containing window 44 and tape 45. The potential of member 43 is slightly negative with respect to cathode 12, so that the electron beam undergoes a deceleration in approaching member 43. In the embodiment of FIG. 5, since only the window 44 and not the entire surface of sheet 43 need be scanned, the beam scanning elements 46 and 47 have supplied thereto a voltage, such as a staircase wave form, from a network 48 which causes the beam to scan the length of window 44, and then return to its starting point, this operation being repeated at high speed.

When no magnetic bit is present on the portion of tape 45 which is disposed adjacent window 44, the electron beam does not undergo any deflection from any field existing around the recorded data, so that the returning beam falls in substantially equal portions on the two symmetrical collector plates 17 and 18 to produce substantially zero output from the differential amplifier 19. However, when there is a magnetic bit present on the portion of the tape adjacent the point of beam impingement in window 44, the magnetic fringe field existing around this bit penetrates window 44 to produce a deflection of the electron beam, in a manner similar to that discussed above for the embodiments of FIGS. 3 and 4. This deflection of the beam causes the electron beam in returning toward the other end of envelope 11 to produce more current flow through one or the other of collector plates 17 and 18 to produce an output pulse from differential amplifier 19. This output pulse, when synchronized with the scanning of the beam by the deflection plates 46 and 47 results in an output signal which provides an indication of the distribution of the recorded bits on tape 45. The speed of advance of tape 45 past window 44 is preferably such, in relation to the rate of scanning of the tape 45 in window 44, that a complete scan of a given width of the tape may be completed before the next incremental surface area of the tape arrives under window 44.

While there have been shown and described and pointed out the fundamental novel features of the invention as applied to the preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claim.

What is claimed is:

Apparatus for determining the distribution of magnetic or electrostatic bits on a surface comprising means for directing a beam of electrons toward said surface, means for decelerating and reversing said electrons as they approach said surface so that said beam reverses direction just prior to reaching said surface but after coming within the field of a bit on said surface immediately adjacent the point of said beam reversal, means for scanning said beam across said surface to cause said beam to successively come within the fields of different ones of said bits, a light-emissive plate having an opening disposed on the path of the returning beam after said reversal of direction, whereby said returning beam passes through said opening when said beam is not deflected by one of said fields surrounding one of said bits, and said beam strikes said light-emissive plate when said beam is deflected by one of said fields, and means for detecting the emission of light from said plate to determine the distribution of said bits on said surface.

References Cited in the file of this patent

UNITED STATES PATENTS

| | | |
|---|---|---|
| 2,214,019 | Gray | Sept. 10, 1940 |
| 2,657,377 | Gray | Oct. 27, 1953 |
| 2,657,378 | Gray | Oct. 27, 1953 |
| 2,724,021 | Goeppinger | Nov. 15, 1955 |
| 2,749,449 | Bradley | June 5, 1956 |
| 2,900,443 | Camras | Aug. 18, 1959 |
| 2,914,696 | Eschbach | Nov. 24, 1959 |

FOREIGN PATENTS

| | | |
|---|---|---|
| 766,763 | Great Britain | Jan. 23, 1957 |